US009798810B2

(12) United States Patent
Wang et al.

(10) Patent No.: US 9,798,810 B2
(45) Date of Patent: Oct. 24, 2017

(54) METHODS AND APPARATUS TO TRACK CHANGES TO A NETWORK TOPOLOGY

(71) Applicant: AT&T Intellectual Property I, L.P., Atlanta, GA (US)

(72) Inventors: Heng Wang, Holmdel, NJ (US); Robert J. Ferro, Jackson, NJ (US); Leah L. Zhang, Holmdel, NJ (US); Luis Figueroa, Spotswood, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 120 days.

(21) Appl. No.: 14/503,349

(22) Filed: Sep. 30, 2014

(65) Prior Publication Data

US 2016/0094383 A1 Mar. 31, 2016

(51) Int. Cl.
*H04L 12/24* (2006.01)
*G06F 17/30* (2006.01)

(52) U.S. Cl.
CPC ........ *G06F 17/30864* (2013.01); *H04L 41/12* (2013.01); *H04L 41/0869* (2013.01)

(58) Field of Classification Search
None
See application file for complete search history.

(56) References Cited

U.S. PATENT DOCUMENTS

| | | | |
|---|---|---|---|
| 5,084,870 A | 1/1992 | Hutchison et al. | |
| 6,069,895 A | 5/2000 | Ayandeh | |
| 7,529,821 B1 * | 5/2009 | Cannon | H04L 41/044 709/223 |
| 7,929,460 B2 | 4/2011 | Chen et al. | |
| 2002/0150055 A1 * | 10/2002 | Tatsumi | H04L 12/40078 370/255 |
| 2003/0208572 A1 * | 11/2003 | Shah | H04L 41/12 709/223 |
| 2005/0154733 A1 * | 7/2005 | Meltzer | H04L 63/1416 |
| 2006/0256733 A1 * | 11/2006 | Bejerano | H04L 41/12 370/254 |

(Continued)

OTHER PUBLICATIONS

Hongqiang Harry Liu, et al., "zUpdate: Updating Data Center Networks with Zero Loss," SIGCOMM '13, Aug. 12-16, 2013, Hong Kong, China, pp. 421-422.

(Continued)

*Primary Examiner* — Philip Chea
*Assistant Examiner* — Hassan Khan
(74) *Attorney, Agent, or Firm* — Hanley, Flight & Zimmerman, LLC

(57) ABSTRACT

Methods and apparatus to track network changes are disclosed herein. An example method to track a network topology includes, in response to a reporting message including topology change information corresponding to a topology change event, generating a confirmation-seeking message based on the topology change information to confirm the topology change event and updating a topology data set representing the network topology based on a response to the confirmation-seeking message. Further disclosed methods include generating a pre-confirmation data record that reflects the topology change information contained in the reporting message, and storing the pre-confirmation data record in a pre-confirmation topology database.

16 Claims, 9 Drawing Sheets

(56) References Cited

U.S. PATENT DOCUMENTS

| | | | |
|---|---|---|---|
| 2007/0268294 A1* | 11/2007 | Eagen | H04L 41/12 345/474 |
| 2009/0201840 A1* | 8/2009 | Pfeiffer, Jr. | H04W 8/005 370/310 |
| 2010/0189005 A1* | 7/2010 | Bertani | H04W 74/02 370/252 |
| 2013/0044641 A1 | 2/2013 | Koponen et al. | |
| 2013/0114466 A1 | 5/2013 | Koponen et al. | |
| 2013/0121209 A1 | 5/2013 | Padmanabhan et al. | |
| 2013/0195113 A1 | 8/2013 | Kotha et al. | |
| 2013/0212644 A1 | 8/2013 | Hughes et al. | |
| 2013/0242804 A1 | 9/2013 | Yabusaki et al. | |
| 2013/0250810 A1* | 9/2013 | Ho | H04L 41/12 370/255 |
| 2013/0266007 A1 | 10/2013 | Kumbhare et al. | |
| 2013/0322443 A1 | 12/2013 | Dunbar et al. | |
| 2013/0329548 A1 | 12/2013 | Nakil et al. | |
| 2013/0329601 A1 | 12/2013 | Yin et al. | |
| 2013/0332619 A1 | 12/2013 | Xie et al. | |
| 2014/0003232 A1 | 1/2014 | Guichard et al. | |
| 2014/0010109 A1* | 1/2014 | Himura | H04L 41/12 370/254 |
| 2014/0050223 A1 | 2/2014 | Foo et al. | |
| 2014/0052877 A1 | 2/2014 | Mao | |
| 2014/0064066 A1 | 3/2014 | Lumezanu et al. | |
| 2014/0089506 A1 | 3/2014 | Puttaswamy et al. | |
| 2014/0098673 A1 | 4/2014 | Lee et al. | |
| 2014/0098678 A1 | 4/2014 | Lumezanu et al. | |
| 2014/0098710 A1 | 4/2014 | Ong | |
| 2014/0112190 A1 | 4/2014 | Chou et al. | |
| 2014/0122668 A1 | 5/2014 | Nieminen | |
| 2014/0149542 A1 | 5/2014 | Luo et al. | |
| 2014/0160984 A1 | 6/2014 | Hallivuori | |
| 2014/0192645 A1 | 7/2014 | Zhang et al. | |
| 2014/0192683 A1 | 7/2014 | Hallivuori et al. | |
| 2014/0192813 A1 | 7/2014 | Hallivuori et al. | |
| 2014/0195666 A1 | 7/2014 | Dumitriu et al. | |

OTHER PUBLICATIONS

Zhi Liu Xiang Wang, et al., "LiveCloud: A Lucid Orchestrator for Cloud Datacenters,"2012 IEEE $4^{th}$ International Conference on Cloud Computing Technology and Science, IEEE Computer Society, 2012, pp. 341-348.

E. Haleplidis, et al., "SDN Layers and Architecture Terminology," Internet Engineering Task Force—Internet Draft, work-in-progress, Mar. 2014, 25 pages.

Manar Jammal, et al., "Software-Defined Networking: State of the Art and Research Challenges," submitted for review and possible publication in Elsevier's Journal of Computer Networks, publication date unknown, 19 pages.

Fei Hu, Abstract of "A Survey on Software Defined Networking (SDN) and OpenFlow: From Concept to Implementation," Communications, Surveys and Tutorials, IEEE Communication Society, (vol. PP;Issue 99) published on May 22, 2014, retrieved from the internet on Jul. 24, 2014, 2 pages.

Srinivasan Keshav, et al., "Project Argus—Network Topology Discovery, Monitoring, History, and Visualization," http://www.cs.cornell.edu/boom/1999sp/projects/Network%20Topology/topology.html, downloaded on Sep. 24, 1014, 4 pages.

* cited by examiner

METHODS AND APPARATUS TO TRACK CHANGES TO A NETWORK TOPOLOGY

FIELD OF THE DISCLOSURE

This disclosure relates generally to computer networks and, more particularly, to tracking changes to a network topology in real time and in near real time.

BACKGROUND

Computer network management tools are currently used to identify changes to the configuration of a network and to track such changes in a network topology database. Additionally, such tools are used to monitor and analyze traffic flow on a computer network so that, when needed, changes can be made to the network topology to enhance performance.

Figure 1:
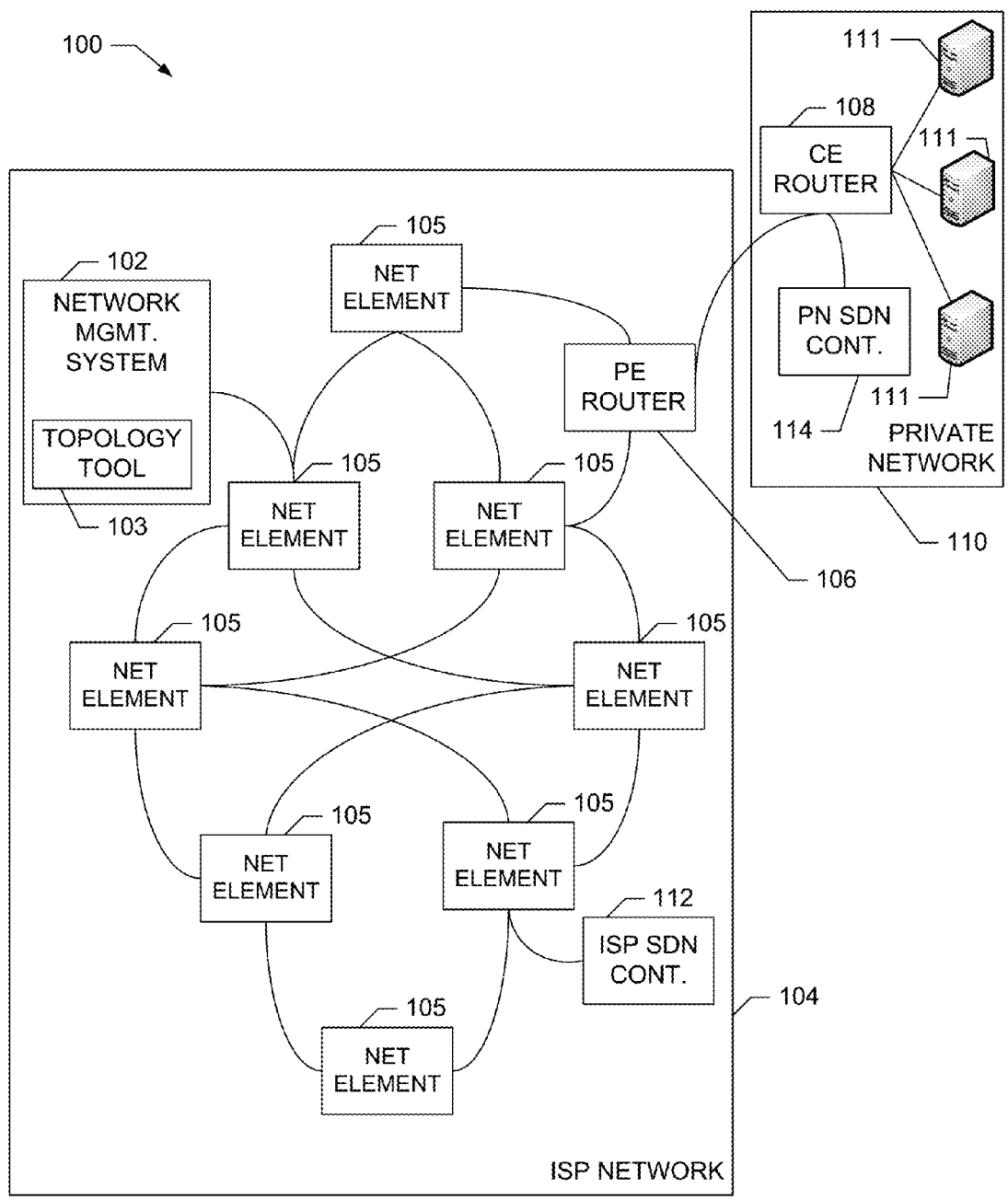
FIG. 1 is a block diagram of an example Internet Service Provider ("ISP") network having an example network management system and coupled to an example private network.

Wherever possible, the same reference numbers will be used throughout the drawing(s) and accompanying written description to refer to the same or like parts. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

DETAILED DESCRIPTION

Methods and apparatus to track changes to a network topology are disclosed herein. Some example methods include, in response to a reporting message including topology change information corresponding to a topology change event, generating a confirmation-seeking message based on the topology information to confirm the topology change event, and updating a topology data set representing the network topology based on a response to the confirmation-seeking message. The example confirmation-seeking message can comprise a loopback address of a network element/device subject to the topology change event, a type of topology change event, a status of the topology change event, and information indicating a position of the network element within the network topology. In some examples, the methods also include generating a pre-confirmation data record that reflects the topology change information contained in the reporting message, and storing the pre-confirmation data record in a pre-confirmation topology database. Updating the network topology data set can include storing the pre-confirmation data record in a post-confirmation topology database.

Further example methods include determining whether a post-confirmation data record corresponding to a network element subject to the topology change event is stored in a post-confirmation topology database. In some examples, the pre-confirmation data record is stored in the pre-confirmation topology database based on whether the post-confirmation data record is determined to be stored in the post-confirmation database. In some examples, updating the topology data set includes storing a post-confirmation data record in a post-confirmation database when the response to the confirmation-seeking message indicates that the topology change event has been confirmed. In some examples, the pre-confirmation data record is a second pre-confirmation data record, and the second pre-confirmation data record is stored in the pre-confirmation database based on whether a first pre-confirmation data record corresponding to a network element subject to the topology change event is stored in the pre-confirmation topology database.

An example tangible computer readable medium disclosed herein stores computer readable instructions which, when executed, cause a computer to, in response to a reporting message corresponding to a network device change, transmit a confirmation-seeking message to confirm the network device change, and update a network configuration data set to reflect the network device change based on a response to the confirmation-seeking message.

In some examples, the instructions further cause the computer to determine, based on the reporting message, a network device subject to the network device change, and store a pre-confirmation configuration record corresponding to the network device in a pre-confirmation configuration database. In some examples, the pre-confirmation configuration record includes network device change information obtained from the reporting message. Further example instructions cause the computer to determine whether a post-confirmation configuration record corresponding to the network device change is stored in a post-confirmation configuration database.

An example apparatus disclosed herein tracks a change to a network topology and includes a memory having machine readable instructions stored thereon, and a processor to execute the instructions to perform operations. In some examples the operations include, in response to a reporting message containing topology change information corresponding to a topology change event, generating a validation seeking message to validate the topology change event, and updating a topology data set representing the network topology based on a response to the validation seeking message. Example operations can further include generating a pre-validation topology record, the pre-validation topology record to reflect the topology change information contained in the reporting message, and storing the pre-validation topology record in a pre-validation topology database.

In some examples, the operation of updating the topology data set includes using the pre-validation topology record to create a post validation topology record, and storing the post validation topology record in a post validation topology database based on a response to the validation seeking message. In further examples, the validation seeking message includes a loopback address of a network element subject to the topology change event, type information identifying a type of the topology change event, and a status of the topology change event. Additionally, example operations include determining whether a post validation topology record corresponding to a network device subject to the topology change event is stored in a post validation topology database. In some examples, the pre-validation topology record is stored in the pre-validation topology database based on whether the post validation data record is determined to be stored in the post validation database. In further examples, updating the topology data set includes storing a post validation topology record in a post validation topology database when the response to the validation seeking message indicates that the topology change event has been confirmed.

Network management systems are becoming increasingly important tools for use in maintaining network health and performance, especially as networks continue to expand in both size and complexity. Such monitoring tools are used to monitor network traffic and identify issues causing poor performance (e.g., bottlenecks, packets drops, etc.). When performance issues are identified by the monitoring tools, network management tools rely on configuration/topology information to understand the existing network topology and then re-route network traffic and/or reconfigure the network as needed. As a result, such monitoring tools typically include mechanisms to collect information about which network elements/devices are coupled to the network and use that information to populate a configuration database. Such tools may also collect information about how the network elements/devices are positioned relative to one another so that network traffic can be re-routed as needed to maintain network performance. To ensure that plans to re-route traffic or reconfigure the network are effective, it is important that the configuration database be kept as up-to-date as possible.

However, the collection of timely network topology/configuration information is an increasingly difficult challenge as networks continue to evolve and expand in size and complexity at an ever-increasing rate. Moreover, the ease and speed with which software-defined networks can be reconfigured further heightens the need for mechanisms to timely collect network configuration information. Unlike conventional networks in which reconfiguration operations typically involve the installation and/or removal of physical interfaces/elements, hundreds and even thousands of interfaces can be added removed in a software-defined network in a span of minutes and even seconds.

Example methods, apparatus, systems and articles of manufacture described herein address some of these issues by using a method to collect network topology/configuration information that is event-driven and that is based on a two-phase commit. The method is event-driven in that each time a software-defined network (SDN) controller makes a network configuration change, also referred to as topology change event and/or a configuration event, the SDN controller transmits a message to a network management system. Thus, the example network management systems disclosed herein become aware of changes to the network configuration/topology when the topology change event occurs instead of becoming aware at a later time when network administrative personnel report the topology change event to the network management system. In some examples, the SDN controller reports a pending topology change event to the network management system to indicate that a particular topology change event is going to occur at a later date/time. Thus, unlike conventional network management systems which often have stale configuration/topology information, the example network management systems and methods described herein are able to monitor a network configuration and collect information about configuration changes/topology change events in real time and use that information to create and maintain an up-to-date topology database.

Upon receiving a reporting message (e.g., a message reporting that a topology change event has occurred, and/or will occur), the example network management systems and methods described herein transmit a confirmation-seeking message to confirm that the topology change event has occurred. In some examples, the reporting message transmitted by the SDN controller indicates that a network element/device is being added, removed, and/or modified and further provides information identifying the network element/device and characteristics of the network element/device. The confirmation-seeking message generated by the network management system in response to the topology change event reporting message is transmitted by the network management system to the network element/device identified in the reporting message. When the confirmation-seeking message is received, the network element/device responds by transmitting a confirmation message confirming the topology change event. If a confirmation message is not received by the network management system, the network management system may transmit a request message to the SDN controller requesting updated information about the topology change event. Thus, the example network management systems described herein collect information about a network topology change event based on a first phase in which a reporting message is received from an SDN controller, and a second phase in which a confirmation message is received from the network element/device subject to the topology change event. After both the first and second phases are complete (e.g., the topology change event has been reported and confirmed), the topology change event is committed to a configuration/topology database maintained by the network management system.

Thus, instead of periodically sending discover messages to a network element/device to identify any topology change events that occurred since the last transmission of a discover message, the example network management systems and methods described herein are configured to seek confirmation of a topology change event in response to real-time topology change event information supplied by an SDN controller. As a result, the network management systems and methods described herein are able to maintain a topology database that is updated to reflect changes to a network as such changes occur.

In some examples, the network management systems disclosed herein respond to a reporting message by incorporating the topology change event into an example first configuration database. The first configuration database, also referred to as a pre-confirmation database and/or pre-validation database, contains information about topology change events that have been reported, but not yet confirmed. Once the topology change event information is confirmed, the topology change event information is supplied to an example second configuration database, also referred to as a post-confirmation database and/or a post-validation database. In this way, network topology information is captured in the first topology database without having to wait until the data is confirmed or validated, thereby providing a real-time or near real-time representation of the configuration at any point in time. However, at least some of the data in the first topology database may turn out to be inaccurate when, for example, a confirmation/validation message is not received in response to a confirmation-seeking message. By only transferring the data to the second topology database after it has been confirmed, the administrator is assured that the network configuration information in the second topology database is accurate. Using two databases to capture network topology information in this manner provides a network administrator with access to real-time or near real-time network configuration information vis-à-vis the first topology database while also assuring a high level of configuration data integrity vis-à-vis the second topology database.

FIG. 1 is a block diagram an example network 100 in communication with an example network management system 102 having a topology tool 103 constructed in accordance with the teachings of this disclosure. In some examples, the network 100 includes an example Internet Service Provider (ISP) network 104 having example network elements/devices 105 by which information is transmitted. In some examples, the network elements/devices 105 may be implemented using routers, switches, hubs, etc. The network elements/devices 105 may be physical or virtual. For illustrative purposes one such network element/device is implemented as an example provider edge ("PE") router 106 coupled to (or otherwise in communication with) an example customer edge ("CE") router 108 of an example private network 110 operated by a customer. The private network 110 also includes example processors/servers 111. In some examples, the ISP network 104 and the private network 110 are software-defined networks (SDNs) such that the ISP network 104 includes an example Internet service provider SDN controller ("ISP SDN controller") 112, and the private network 110 includes an example private network SDN controller ("PN SDN controller") 114. The ISP SDN controller 112 operates to provision and/or configure one or more of the network elements/devices 105 and the PE router 106 on the ISP network 104 and the PN SDN controller 114 is used to provision and/or configure the CE router 108 on the private network 110.

In some examples, when a topology change event occurs at the PE router 106, the example ISP SDN controller 112 generates and transmits a reporting message indicating the topology change event has occurred. Upon receipt of the reporting message at the example network management system 102, the example topology tool 103 generates an example pre-confirmation topology data record (also referred to as a pre-validation data record) corresponding to the topology change event and stores the pre-confirmation topology data record in a first topology database 204 (described with reference to FIG. 2). In addition, the topology tool 103 generates a confirmation-seeking message to confirm that the topology change event occurred and transmits the confirmation-seeking message to the PE router 106. The PE router 106 responds with a confirmation/validation message confirming that the topology change event occurred (provided that the event did occur). Upon receiving the confirmation/validation message, the topology tool 103 generates an example post-confirmation topology data record (also referred to as a post-validation data record) corresponding to the confirmation of the topology change event and stores the post-confirmation topology data record in a second topology database 206 (described with reference to FIG. 2). Although the illustrated example of FIG. 1 includes an ISP SDN controller 112 to configure the network elements 105 and the PE router 106 on the ISP network 104 and the PN SDN controller 114 to configure the CE router 108 on the private network 110, a single SDN controller may be used to provision/configure the network elements 105 on both the ISP network 104 and the private network 110. Likewise, although a single network management system 102 is shown coupled to the ISP network 104, a second, separate network management system 102 may also be used to manage the private network 110.

Referring still to FIG. 1, in some examples, the ISP SDN controller 112 is programmed to execute an example topology change event affecting a network element/device such as an interface associated with the example PE router 106. Upon being programmed to execute the topology change event, the ISP SDN controller 112 transmits a reporting message to the topology tool 103. The reporting message is formatted to conform to a reporting message protocol. In some examples, the reporting message protocol is defined to include: 1) a unique identifier ("UID") that uniquely identifies the network element to be subject to the topology change event (e.g., the PE router 106, any of the network elements/devices 105, etc.), 2) information indicating a type of topology change event to be performed (e.g., add an interface, remove an interface, change an interface, etc.), and 3) a status of the topology change event such as, pending, completed, delayed, canceled. In some examples, the protocol can be further defined to include a timestamp at which a reporting message is generated, a date/time identifier indicating a date/time at which the topology change event is to be performed, additional information about the configuration of the element/device subject to the topology change event, etc. In some examples, the UID includes a loopback IP address ("LBIP") of the network element/device coupled with one or more of: 1) a router interface name ("IfName"), 2) a quality of service ("QoS") policy, 3) an identifier of an IP tunnel interface on a router ("TE-Tunnel"), etc. Thus, the UID can take the form of any of 1) "LBIP+IfName+QoSpolicy," 2) "LBIP+IfName," 3) "LBIP+ClassMap," etc.

Figure 2:
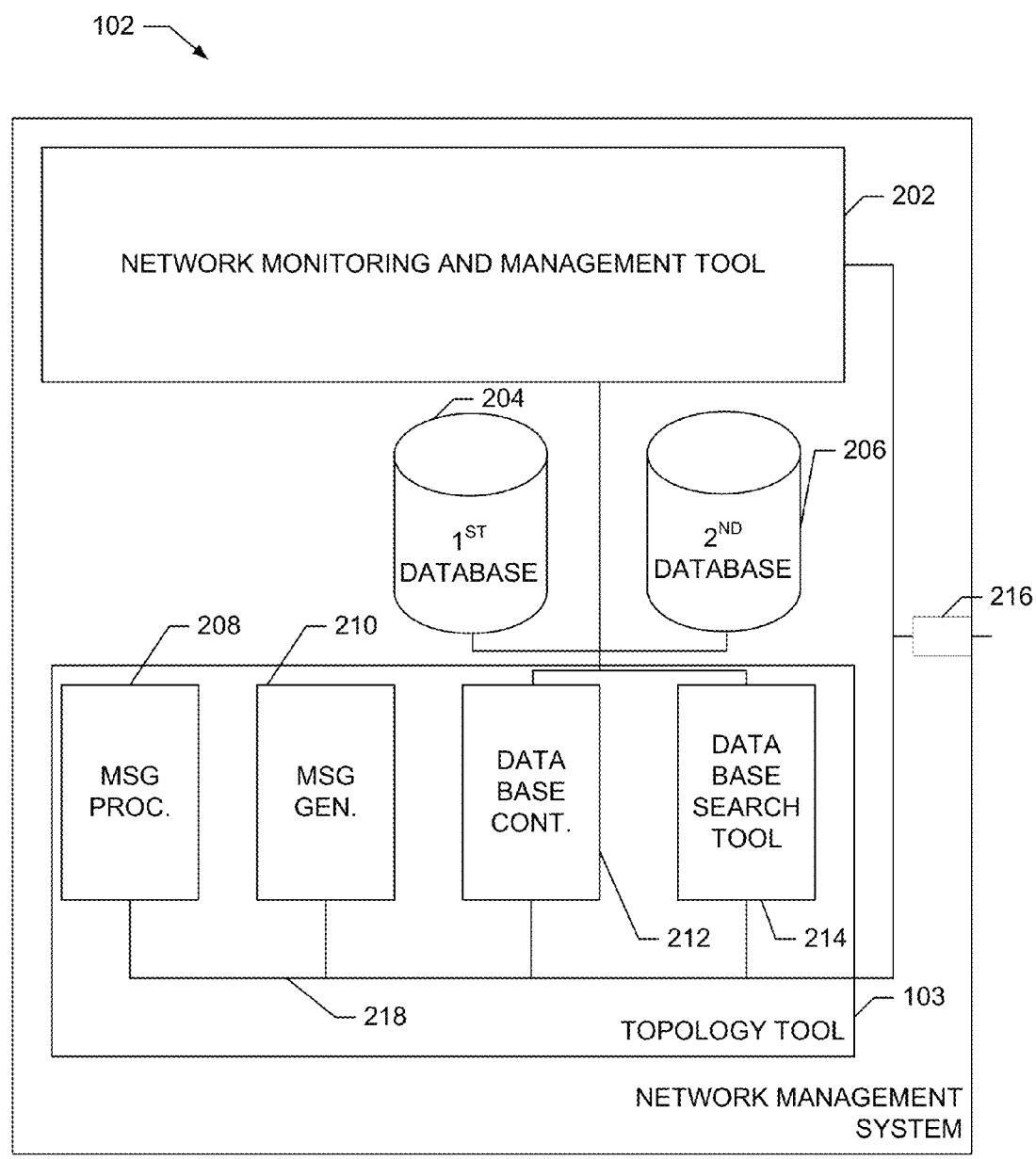
FIG. 2 is a block diagram of an example implementation of the example network management system of FIG. 1 having an example topology tool.

A block diagram of an example implementation of the example network management system 102 of FIG. 1 is illustrated in FIG. 2. As shown, in addition to the example topology tool 103, the example network management system 102 includes an example network monitoring and management tool 202, an example first topology database 204, and an example second topology database 206. The network monitoring and management tool 202 performs various network monitoring tasks including determining a manner in which the network devices 105 are coupled and, when necessary, re-routing network traffic to improve network operating parameters such as throughput, speed, efficiency, etc. The topology tool 103 tracks the occurrence of topology change events, such as, the addition of network elements/devices 105 and/or the PE router 106, the removal/deletion of network elements/devices 105 and/or the PE router 106, the modification of network elements/devices and/or the PE Router 106, etc. In some examples, the topology tool 103 includes a message processor 208 to process configuration/topology reporting messages and confirmation messages, a message generator 210 to generator confirmation-seeking messages and error messages, a database controller 212 to generate, delete, or otherwise modify topology data records, and a database search tool 214.

As described above, when programmed to execute a topology change event affecting a network element/device such as an interface associated with the example PE router 106, the ISP SDN controller 112 (see FIG. 1) transmits a reporting message to the topology tool 103. The reporting message is received at an example transceiver 216 in the example network management system 102 and subsequently delivered to the example message processor 208 via an example communication bus 218 by which the message processor 208, the example message generator 210, the example database controller 212 and the example database search tool 214 are communicatively coupled. The message processor 208 processes the reporting message to extract the information contained therein including, for example, the type of topology change event being reported, the UID of the network element/device subject to the topology change event (e.g., the PE router 106), and the status of the topology change event (e.g., pending, completed, canceled, delayed, etc.). The message processor 208 transmits the extracted information to the database controller 212 which generates a first topology data record (also referred to as a pre-confirmation and/or pre-validation data record) containing the extracted information and causes the first topology data record to be stored in the example first topology database 204 (also referred to as a pre-confirmation and/or pre-validation database). Thus, the first topology database 204 contains records related to topology change events that have not yet been confirmed/validated. The message processor 208 also supplies the extracted information to the message generator 210 which uses the information to generate a confirmation-seeking message. The confirmation-seeking message is transmitted via the transceiver 216 to the element/device associated with the UID.

Upon receiving a confirmation/validation message (provided the network element/device subject to the topology change event responds to the confirmation-seeking message with a confirmation/validation message), the example message processor 208 extracts information contained in the confirmation message and transmits the extracted information to the example database controller 212 for use in generating a second topology data record (also referred to as a post-confirmation or post validation data record). The database controller 212 causes the second topology data record to be stored in the example second topology database 206 (also referred to as a post-confirmation and/or post validation database). Thus, the second topology database 206 contains configuration information related to topology change events that have been confirmed/validated.

In some examples, before generating a first topology data record and/or a second topology data record, the example message processor 208 instructs the example database search tool 214 to search the example first and/or the second topology databases 204, 206 to determine whether a record(s) having the UID is stored therein. If such a record(s) is located in the first and/or the second topology database 204, 206, the message processor 208 may forego instructing the example database controller 212 to create a new data record having the same UID. In this way, the example topology tool 103 ensures that that the first topology database 204 and the second topology database 206 each only have one data record corresponding to each UID. In some examples, if such a configuration record is located in the first and/or the second topology database 204, 206, the message processor 208 may instruct the database controller 212 to update the located record with information obtained from the reporting message and/or the confirmation message. In some examples, if a reporting message is received indicating that a network element/device 105 (see FIG. 1) having a UID is to be added to the network, but the database search tool 214 determines that a record corresponding to the UID is already present in the first and/or the second topology database 204, 206, the message processor 208 may cause the example message generator 210 to generate an error message for delivery to the example ISP SDN controller 112 (see FIG. 1) from which the reporting message was received. Such a scenario may occur when, for example, the ISP SDN controller 112 (see FIG. 1) repeatedly sends a same reporting message to account for the possibility that one or more of the reporting messages are not successfully delivered to the example network management system 102. The error message generated by the message generator 210 may be transmitted to the ISP SDN controller 112 and may instruct the ISP SDN controller 112 to stop sending any additional reporting messages for the same topology change event.

In the illustrated example of FIG. 2, both the example topology tool 103 and the example network monitoring and management tool 202 are in communication with, and able to access, the example first and second topology databases 204, 206. In some such examples, the network monitoring and management tool 202 communicates with the example network elements/devices 105 and the example PE router 106 represented in the first and second topology databases 204, 206 to obtain information identifying how the elements/devices 105 and the PE router 106 are positioned in the ISP network 104 relative to each other. Thus, the topology tool 103 populates the first and second topology databases 204, 206 with an inventory of the elements/devices 105 and the PE router 106 in the network and the network monitoring and management tool 202 populates the first and second topology databases 204, 206 with information about the positions of the elements/device 105 and the PE router 106 relative to each other. In addition, the network monitoring and management tool 202 monitors network traffic and additionally can use the information stored in both the first and second topology databases 204, 206 to determine how traffic is to be re-routed in response to poor network performance.

While an example manner of implementing the example network management system 102 of FIG. 1 has been illustrated in FIG. 2 one or more of the elements, processes and/or devices illustrated in the FIG. 2 can be combined, divided, re-arranged, omitted, eliminated and/or implemented in any other way. Further, any of the example topology tool 103, the example network monitoring and management tool 202, the example first topology database 204, the example second topology database 206, the example message processor 208, the example message generator 210, the example database controller 212, the example database search tool 214, the example transceiver 216, the example communication bus 218 and/or, more generally, the example network management system 102 may be implemented by hardware, software, firmware and/or any combination of hardware, software and/or firmware. Thus, for example, any of the example topology tool 103, the example network monitoring and management tool 202, the example first topology database 204, the example second topology database 206, the example message processor 208, the example message generator 210, the example database controller 212, the example database search tool 214, the example transceiver 216, the example communication bus 218 and/or, more generally, the example network management system 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example topology tool 103, the example network monitoring and management tool 202, the example first topology database 204, the example second topology database 206, the example message processor 208, the example message generator 210, the example database controller 212, the example database search tool 214, and/or the example transceiver 216 is/are hereby expressly defined to include a tangible computer readable storage device or storage disk such as a memory, a digital versatile disk (DVD), a compact disk (CD), a Blu-ray disk, etc. storing the software and/or firmware. Further still, the example network management system 102 of FIG. 1 and FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the network management system 102 of FIG. 1 and FIG. 2 are shown in FIGS. 3, 4, 5, 6, 7, and/or 8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 3, 4, 5, 6, 7 and 8 many other methods of implementing the example network management system 102 may alternatively be used. For example, the order of execution of the blocks may be changed, and/or some of the blocks described may be changed, eliminated, or combined.

As mentioned above, the example processes of FIGS. 3, 4, 5, 6, 7, and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, 5, 6, 7, and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 3:
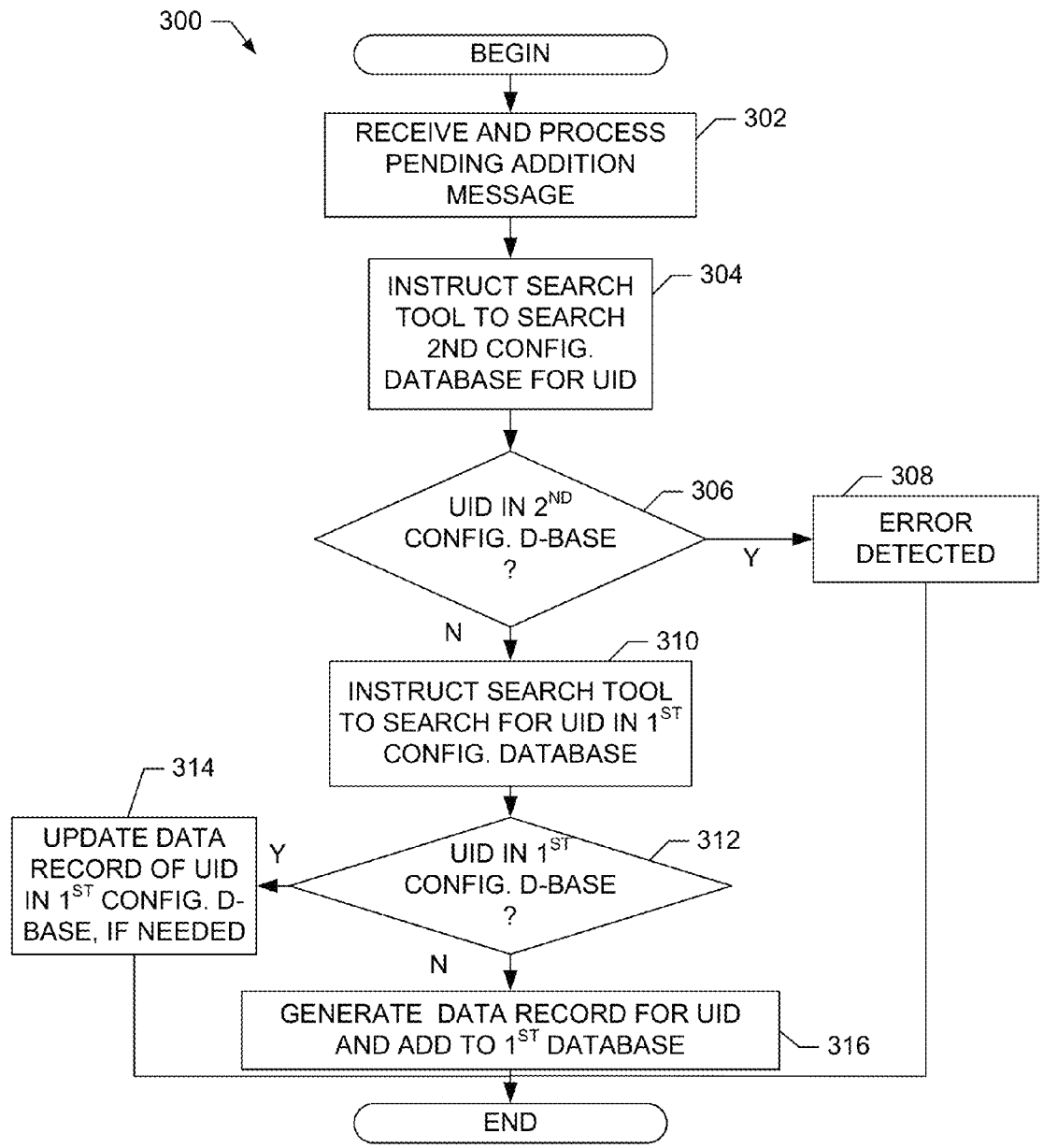
FIG. 3 is a flowchart representative of example computer readable instructions that can be executed by the example topology tool of FIG. 2 to communicate and track a pending addition of an example network element to the ISP network of FIG. 1.

Example machine readable instructions 300 that may be executed to implement the network management system 102 of FIGS. 1 and 2 are represented by the flowchart shown in FIG. 3. The example machine readable instructions 300 may be executed periodically and/or aperiodically (e.g., at predetermined intervals, based on an occurrence of a predetermined event, etc., or any combination thereof). The machine readable instructions 300 begin execution at a block 302 of FIG. 3 at which the example message processor 208 (see FIG. 2) receives a topology change reporting message indicating that a topology change event is going to occur. In the illustrated example, the topology change event is the addition of an interface at the example PE router 106 (see FIG. 1) that will be coupled to the example CE router 108 (see FIG. 1) at a future time (also referred to as an "addition pending" topology change event). The message processor 208 extracts, from the addition pending reporting message, the UID of the interface to be added and instructs the example database search tool 214 (see FIG. 2) to search the example second topology database 206 (see FIG. 2) for a post-confirmation data record corresponding to the UID (block 304).

In response, the database search tool 214 searches the second topology database 206. If the database search tool 214 determines that a post-confirmation data record corresponding to the UID is already present in the second topology database 206 database (block 306), an error is detected (block 308) and the method ends. Such a situation may arise when, for example, the topology change event identified in the current reporting message was previously captured in the example second topology database 206 as a result of processing a reporting message received at an earlier time. When a topology change event occurs, the SDN controller that performs the topology change event (e.g., the example ISP SDN controller 112) may generate and transmit multiple reporting messages for delivery to the network management system 102 in an effort to compensate for the possibility that one or more of the messages do not successfully reach the network management system 102. Thus, after a topology change event reporting message has been processed, reporting messages pertaining to the same topology change event may subsequently arrive at the network management system 102. The example topology tool 103 (see FIG. 1 and FIG. 2) is adapted to handle such repetitive reporting messages by searching the second topology database 206 (as described with reference to block 306) to determine whether the topology change event has already been processed such that the topology change event is already documented in the second topology database 206. Thus, the method ends when a post-confirmation data record having a UID corresponding to an addition pending reporting message that is currently being processed is already present in the second topology database 206. In some examples, the example message processor 208 may cause the example message generator 210 (see FIG. 2) to generate and transmit a message to the ISP SDN controller 112 indicating that the topology change event has been captured in the second configuration database 206 such that further messages reporting the topology change event need not be transmitted.

If, instead, the example database search tool 214 determines that a post-confirmation data record corresponding to the UID extracted from the reporting message is not present in the example second topology database 206 (block 306), the example message processor 208 instructs the example database search tool 214 to search the example first topology database 204 (see FIG. 2) for a pre-confirmation data record corresponding to the UID (block 310). If the database search tool 214 determines that a pre-confirmation data record corresponding to the UID is already present in the first topology database 204 (block 312), it is assumed that the record was added in response to a reporting message processed at an earlier time. Thus, the message processor 208 instructs the database controller 212 to update the located record with the information contained in the reporting message currently being processed to thereby capture updated information that has been communicated in the most recently received reporting message, if any (block 314). If the database search tool 214 determines that a record corresponding to the UID is not located in the first topology database 204 (block 312), the message processor 208 causes the example database controller 212 to generate and store a pre-confirmation data record containing the information extracted from the reporting message in the first topology database 204 (block 316).

Figure 4:
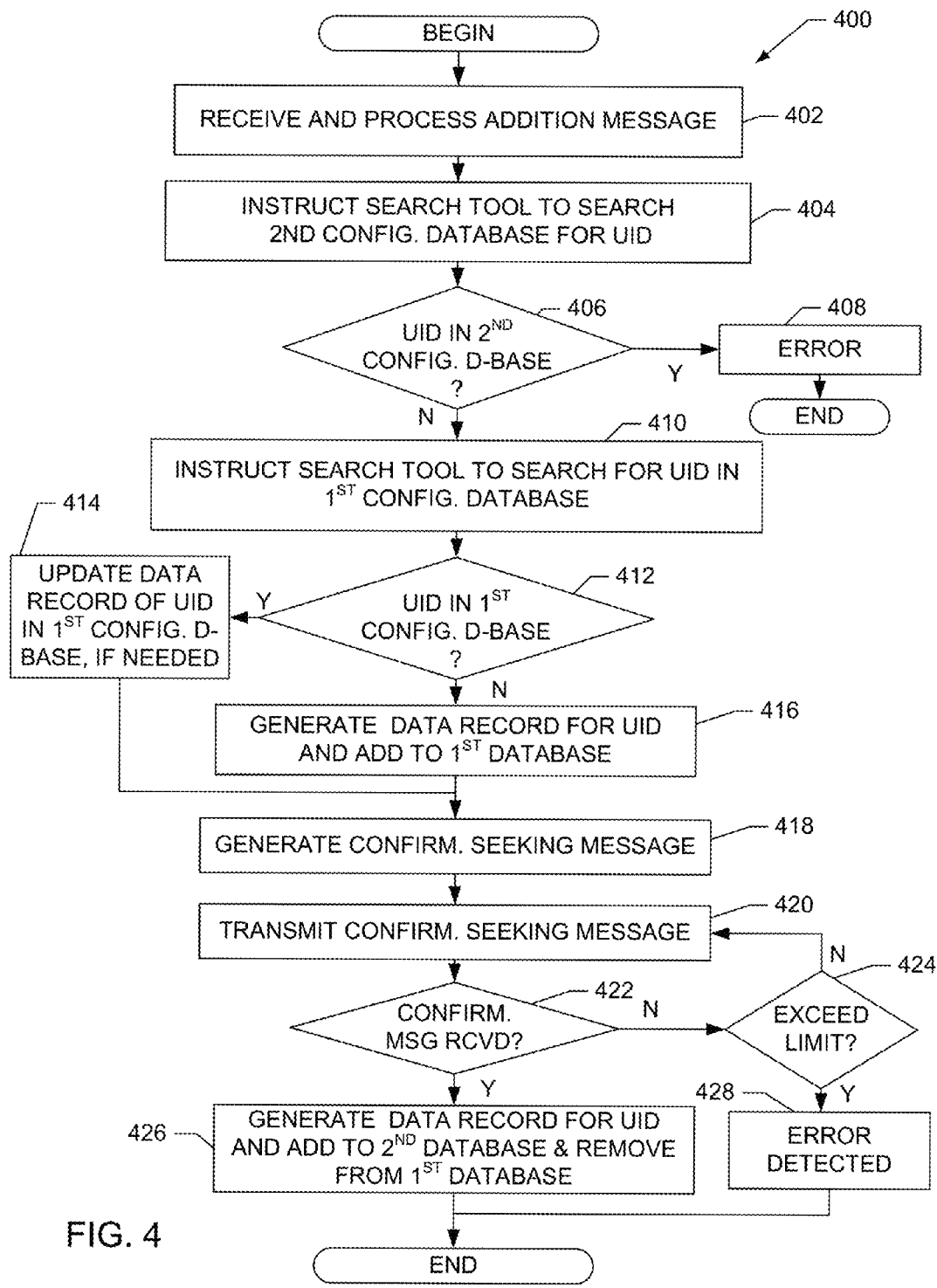
FIG. 4 is a flowchart representative of example computer readable instructions that can be executed by the example topology tool of FIG. 2 to communicate and track the addition of an example network element to the ISP network of FIG. 1.

Example machine readable instructions 400 that may be executed to implement the elements of FIGS. 1-2 are represented by the flowchart shown in FIG. 4. The example machine readable instructions 400 may be executed periodically and/or aperiodically (e.g., at predetermined intervals, based on an occurrence of a predetermined event, etc., or any combination thereof). The machine readable instructions 400 begin execution at a block 402 of FIG. 4 at which the example message processor 208 (see FIG. 2) receives a configuration reporting message indicating that a topology change event has occurred. In the illustrated example, the topology change event is the addition of the interface between the example PE router 106 (see FIG. 2) and the example CE router 108 (see FIG. 2) to the network (also referred to as an "addition" topology change event). The message processor 208 extracts the UID of the interface to be added from the addition reporting message and instructs the example database search tool 214 (see FIG. 2) to search the example second topology database 206 (see FIG. 2) for a post-confirmation data record corresponding to the UID (block 404). In response, the database search tool 214 searches the second topology database 206. If the database search tool 214 determines that a post-confirmation data record corresponding to the UID is already present in the second configuration database 206, an error is detected and the method ends. As described above with reference to FIG. 3, a post-confirmation data record corresponding to the UID may be present in the second topology database 206 as a result of the processing of an earlier-processed addition reporting message.

If, instead, the example database search tool 214 determines that a post-confirmation data record corresponding to the UID is not present in the example second topology database 206 (block 406), the example message processor 208 instructs the database search tool 214 to search the example first topology database 204 (see FIG. 2) for a pre-confirmation data record corresponding to the UID extracted from the reporting message (block 410). If the database search tool 214 determines that a pre-confirmation data record corresponding to the UID is already present in the example first topology database 204 (block 412), it is assumed that the record was added in response to a reporting message that was received and processed at an earlier time. As a result, the message processor 208 instructs the example database controller 212 to update the located pre-confirmation data record with the information contained in the reporting message currently being processed to thereby capture any updated information that has been communicated in the current reporting message (block 414). If the information contained in the reporting message currently being processed is the same as the information in the located pre-confirmation data record, then the record need not be updated.

If the example database search tool 214 determines that a pre-confirmation data record corresponding to the UID is not located in the example first topology database 204 (block 412), the example message processor 208 causes the example database controller 212 to generate and store a pre-confirmation data record containing the information extracted from the reporting message in the first topology database 204 (block 416). The message processor 208 also causes the example message generator 210 to generate a confirmation-seeking message for use in confirming that the interface to the PE router 106 corresponding to the UID extracted from the addition reporting message did indeed get added to the ISP network 112 (block 418). The confirmation-seeking message is transmitted by the message generator 210 to the example PE router 106 (block 420). If the message processor 208 does not receive a confirmation message from the PE router 106 within a desired threshold amount of time, the message processor 208 determines how many confirmation-seeking messages were previously transmitted to the PE router 106 (block 424). If the number of confirmation-seeking messages previously transmitted to the PE router 106 exceeds a desired threshold number, the message processor 208 detects an error (block 428) and the method comes to an end. If the number of confirmation-seeking messages previously transmitted to the PE router 106 does not exceed a desired threshold number, the message processor 208 causes the message generator to re-transmit another confirmation-seeking message to the PE router 106 (block 420). By retransmitting the confirmation-seeking message multiple times, the network management system 102 (see FIG. 1 and FIG. 2) compensates for messages that may be dropped before reaching their destination.

If the example message processor 208 receives a confirmation message from the example PE router 106 (block 422), thereby indicating the PE router 106 interface has indeed been added to the example ISP network 104, the message processor 208 extracts information from the confirmation message and causes the example database controller 212 to use the information to generate and store a post-confirmation record corresponding to the UID of the interface on the PE router 106 in the example second topology database 206 (block 426). In some examples, the message processor 208 also causes the database controller 212 to remove the pre-confirmation record corresponding to the UID of the interface from the example first topology database 204 and/or flags the pre-confirmation record to thereby indicate that the configuration event associated therewith has been confirmed.

In some examples, the confirmation-seeking message is formatted using an internet protocol for managing devices on a network such as the Simple Network Management Protocol "SNMP." Such an example message can include the UID that uniquely identifies the network element/device subject to the topology change event, the type of topology change event, and the status of the topology change event. In some examples, the confirmation-seeking message can additionally include a request for routing information stored in a Management Information Base ("MIB") located at the PE router 106. The MIB can include IP addresses of network devices within one or two hops of the PE router 106. The routing information supplied by the PE router 106 can be stored in the first and/or the example second topology database 206 or in any other database accessible to the example network management system 102. The network management system 102 can subsequently use this routing information to re-route traffic when needed to improve network performance.

Figure 5:
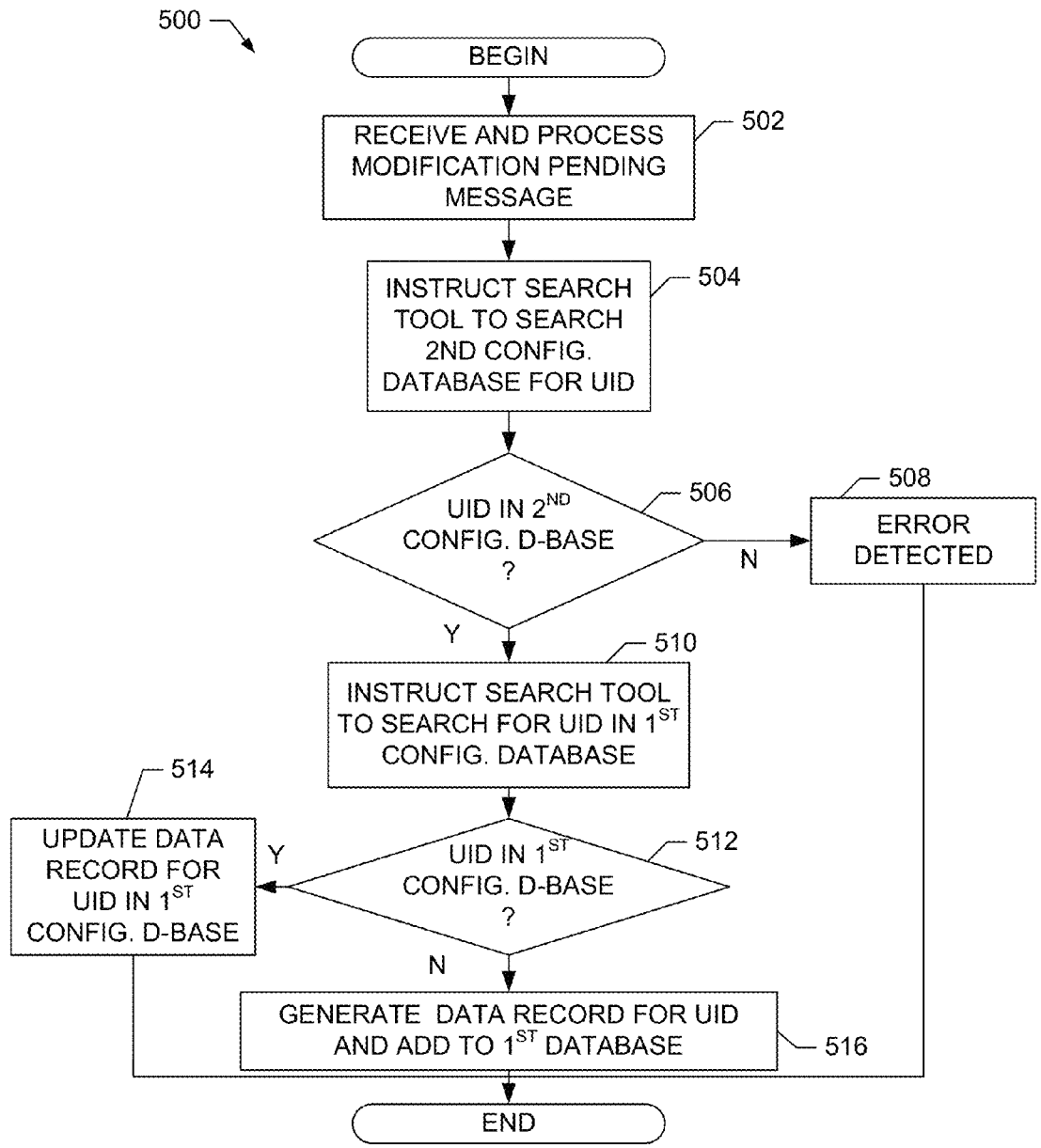
FIG. 5 is a flowchart representative of example computer readable instructions that can be executed by the example topology tool of FIG. 2 to communicate and track a pending modification of an example network element to the ISP network of FIG. 1.

Example machine readable instructions 500 that may be executed to implement the elements of FIGS. 1-2 are represented by the flowchart shown in FIG. 5. The example machine readable instructions 500 may be executed periodically and/or aperiodically (e.g., at predetermined intervals, based on an occurrence of a predetermined event, etc., or any combination thereof). The machine readable instructions 500 begin execution at a block 502 of FIG. 5 at which the example message processor 208 (see FIG. 2) receives a configuration reporting message indicating that a topology change event is going to occur. In the illustrated example, the topology change event is the modification of the PE router 106 (also referred to as a "modification pending" topology change event). Example modifications can include a change to any of the attributes associated with a network device/element including, for example, a data rate used by the network element device, a data protocol used by the network device/element, a QoS policy assigned to the network device/element, etc. The message processor 208 extracts, from the reporting message, the UID of the PE router 106 to be modified and instructs the example database search tool 214 (see FIG. 2) to search the example second topology database 206 for a post-confirmation record corresponding to the UID (block 504). In response, the database search tool 214 searches the second topology database 206 (block 506).

If the database search tool 214 determines that a post-confirmation data record corresponding to the UID is not present in the database, an error is detected (block 508) and the method ends. Such an error situation may arise when, for example, the PE router 106 (or other example network element/device 105) to be modified has not previously been reported as having been added to the example ISP network 104 (see FIG. 2) such that the example second topology database 206 has no corresponding post-confirmation record for the element/device 105. In some such examples, the message processor 208 may cause the message generator 210 to generate and transmit a message to the example ISP SDN controller 112 (see FIG. 2) indicating that the PE router 106 (or other network element/device 105) subject to the modification is not in the second topology database 206. The message can further instruct the ISP SDN controller 112 to determine whether the proper UID was used to identify the PE router 106 (or other network element/device 105) to be modified in the reporting message and, if so, can instruct the SDN controller 112 to send a new reporting message with the proper UID.

If, instead, the example database search tool 214 determines that a post-confirmation data record corresponding to the UID in the pending modification reporting message is present in the example second topology database 206 (block 506), the example message processor 208 instructs the database search tool 214 to search the example first topology database 204 for a pre-confirmation record corresponding to the UID (block 510). If the database search tool 214 determines that a pre-confirmation record corresponding to the UID is already present in the first topology database 204 (block 512), the message processor 208 instructs the example database controller 212 to update the located pre-confirmation data record with the information contained in the modification pending reporting message currently being processed (block 514). If the database search tool 214 determines that a pre-confirmation record corresponding to the UID is not located in the example first topology database 204 (block 512), the message processor 208 causes the database controller 212 to generate and store a pre-confirmation data record containing the information extracted from the modification pending reporting message in the first topology database 204 (block 516). After adding the pre-confirmation data record, the method ends.

Figure 6:
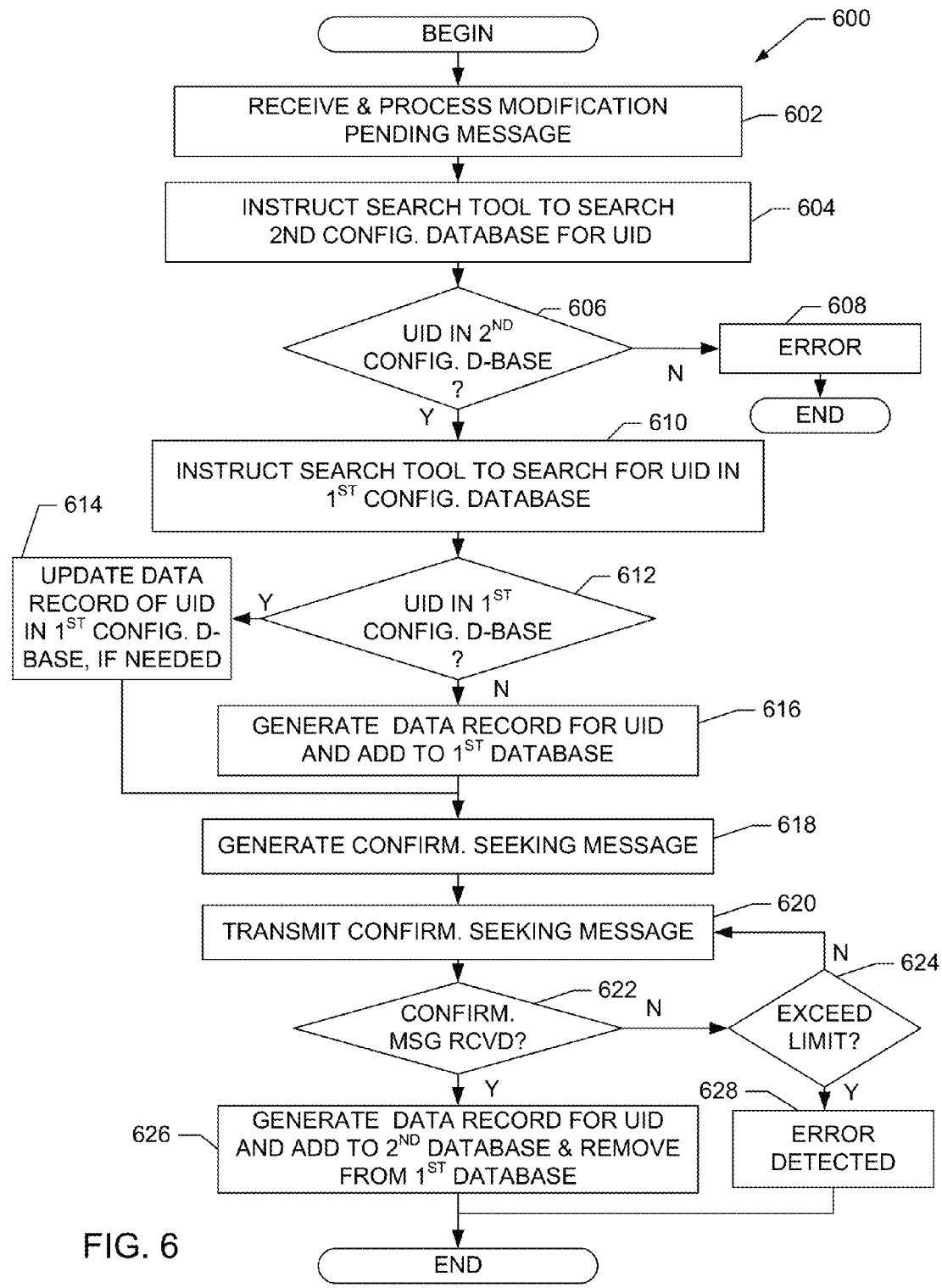
FIG. 6 is a flowchart representative of example computer readable instructions that can be executed by the example topology tool of FIG. 2 to communicate and track a modification of an example network element to the ISP network of FIG. 1.

Example machine readable instructions 600 that may be executed to implement the elements of FIGS. 1-2 are represented by the flowchart shown in FIG. 6. The example machine readable instructions 600 may be executed periodically and/or aperiodically (e.g., at predetermined intervals, based on an occurrence of a predetermined event, etc., or any combination thereof). The machine readable instructions 600 begin execution at a block 602 of FIG. 6 at which the example message processor 208 (see FIG. 2) receives a reporting message indicating that a topology change event has occurred. In the illustrated example, the topology change event is the completion of the modification of the interface between the PE router 106 (see FIG. 2) and the CE router 108 (see FIG. 2) to the network (also referred to as a "modification complete" topology change event). The message processor 208 extracts the UID of the modified interface from the reporting message and instructs the example database search tool 214 (see FIG. 2) to search the example second topology database 206 (see FIG. 2) for a post-confirmation data record corresponding to the UID (block 604). In response, the database search tool 214 searches the second topology database 206 (block 606). If the database search tool 214 determines that a post-confirmation data record corresponding to the extracted UID is not present in the second topology database 206 (block 606), an error is detected (block 608) and the method ends. In response to the detection of such an error, the message processor 208 may perform any number of actions including causing the example message generator 210 (see FIG. 2) to generate and transmit a message to the example SDN controller 112 (see FIG. 2) indicating that the second topology database 206 does not contain a post-confirmation data record of any device corresponding to the UID being present in the example ISP network 104 (see FIG. 1). The message may further request that the SDN controller 112 ensure that the proper UID is being used and/or may instruct the SDN to report the presence of any such device corresponding to the UID in the ISP network 104.

If, instead, the example database search tool 214 determines that a post-confirmation data record corresponding to the UID is present in the example second topology database 206 (block 606), the example message processor 208 instructs the database search tool 214 to search the example first topology database 204 (see FIG. 2) for a pre-confirmation record corresponding to the UID (block 610). If the database search tool 214 determines that a pre-confirmation data record corresponding to the UID is already present in the first topology database 204 (block 612), the message processor 208 instructs the example database controller 212 to update the located pre-confirmation data record with the modification information contained in the reporting message currently being processed (block 614).

If the example database search tool 214 determines that a pre-confirmation data record corresponding to the UID is not located in the example first topology database 204 (block 612), the example message processor 208 causes the example database controller 212 to generate and store a pre-confirmation data record containing the information extracted from the modification complete reporting message in the first topology database 204 (block 616). The message processor 208 also causes the example message generator 210 to generate a confirmation-seeking message for use in confirming that the network element/device 105 corresponding to the UID extracted from the modification complete reporting message did indeed get modified in the manner reported (block 618). The confirmation-seeking message is transmitted by the message generator 210 to the example network element/device 105 subject to the modification (block 620). If the message processor 208 does not receive a confirmation message from the interface of the PE router 106 that was modified within a threshold amount of time (block 622), the message processor 208 determines how many confirmation-seeking messages were previously transmitted to the interface of the PE router 106 (block 624). If the number of confirmation-seeking messages previously transmitted to the network element/device 105 subject to the modification exceeds a threshold number, the message processor 208 detects an error (block 628) and the process comes to an end. If the number of confirmation-seeking messages previously transmitted to the interface of the PE router 106 subject to the modification does not exceed a threshold number (block 624), the message processor 208 causes the message generator 210 to re-transmit another confirmation-seeking message to the interface of the PE router 106.

If the example message processor 208 receives a confirmation message from the interface of the example PE router 106 indicating that the modification has been performed (block 622), the example message processor 208 extracts information from the confirmation message and causes the example database controller 212 to use the information to change the record corresponding to the UID of the PE router 106 interface in the example second topology database 206 to reflect that the modification that was completed/confirmed (block 626). In addition, the message processor 208 causes the database controller 212 to remove the data record corresponding to the UID from the example first topology database 204 (also at block 626) and the method ends. In some examples, the data record corresponding to the UID is not removed from the first topology database, but is instead the data record is flagged to indicate that the data associated therewith has been confirmed.

As described above, in some examples, the confirmation-seeking message is formatted using an internet protocol for managing devices on a network such as the Simple Network Management Protocol "SNMP." As also described above, such an example message can include the UID that uniquely identifies the network element/device subject to the topology change event, the type of topology change event being performed, and the status of the topology change event.

Figure 7:
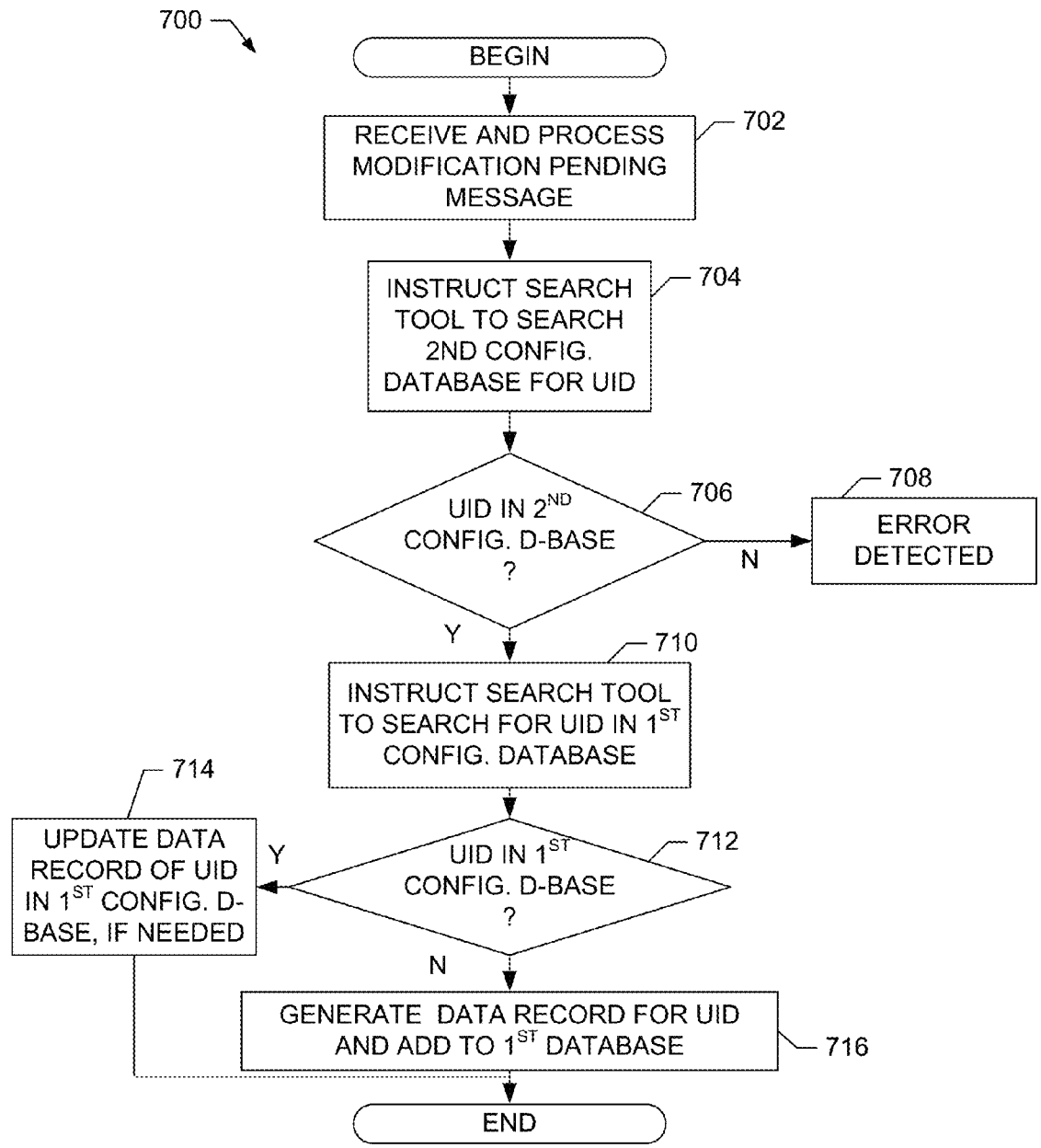
FIG. 7 is a flowchart representative of example computer readable instructions that can be executed by the example topology tool of FIG. 2 to communicate and track the pending removal/deletion of an example network element from the ISP network of FIG. 1.

Example machine readable instructions 700 that may be executed to implement the elements of FIGS. 1-2 are represented by the flowchart shown in FIG. 7. The example machine readable instructions 700 may be executed periodically and/or aperiodically (e.g., at predetermined intervals, based on an occurrence of a predetermined event, etc., or any combination thereof). The machine readable instructions 700 begin execution at a block 702 of FIG. 7 at which the example message processor 208 (see FIG. 2) receives a reporting message indicating that a topology change event is going to occur. In the illustrated example, the topology change event is the deletion/removal of an interface at the example PE router 106 (see FIG. 2) (also referred to as a "deletion pending" topology change event). The message processor 208 extracts, from the reporting message, the UID of the interface to be deleted and instructs the example database search tool 214 (see FIG. 2) to search the second topology database 206 (see FIG. 2) for a post-confirmation data record corresponding to the UID (block 704). If the database search tool 214 determines that a post-confirmation data record corresponding to the UID is not present in the second topology database 206 (block 706), an error is detected (block 708) and the method ends. As described above, such a situation may arise when the topology change event identified in the deletion pending reporting message was previously captured in the second topology database 206 as a result of processing a deletion pending reporting message received at an earlier time. When this occurs, the method ends and, in some examples, the message processor 208 may take other actions such as causing the example message generator 210 (see FIG. 2) to generate and transmit a message to the example ISP SDN controller 112 (see FIG. 1) indicating that the topology change event has been captured in the second topology database 206 such that further messages reporting the topology change event need not be transmitted.

If, instead, the example database search tool 214 determines that a post-confirmation data record corresponding to the UID is present in the example second topology database 206 (block 706), the example message processor 208 instructs the database search tool 214 to search the example first topology database 204 for a pre-confirmation data record corresponding to the UID (block 710). If the database search tool 214 determines that a pre-confirmation data record corresponding to the UID is already present in the first topology database 204 (block 712), the message processor 208 instructs the example database controller 212 (see FIG. 2) to update the located record with the information contained in the reporting message currently being processed to thereby capture any updated information that has been communicated in the most recently received reporting message (block 714). If the database search tool 214 determines that a pre-confirmation data record corresponding to the UID is not located in the first topology database 204, the message processor 208 causes the database controller 212 to generate and store a pre-confirmation data record containing the information extracted from the deletion pending reporting message in the first topology database 204 (block 716). As a result, the first topology database 204 now contains a pre-confirmation data record indicating that the interface of the PE router 106 corresponding to the UID is to be deleted at a future time.

Figure 8:
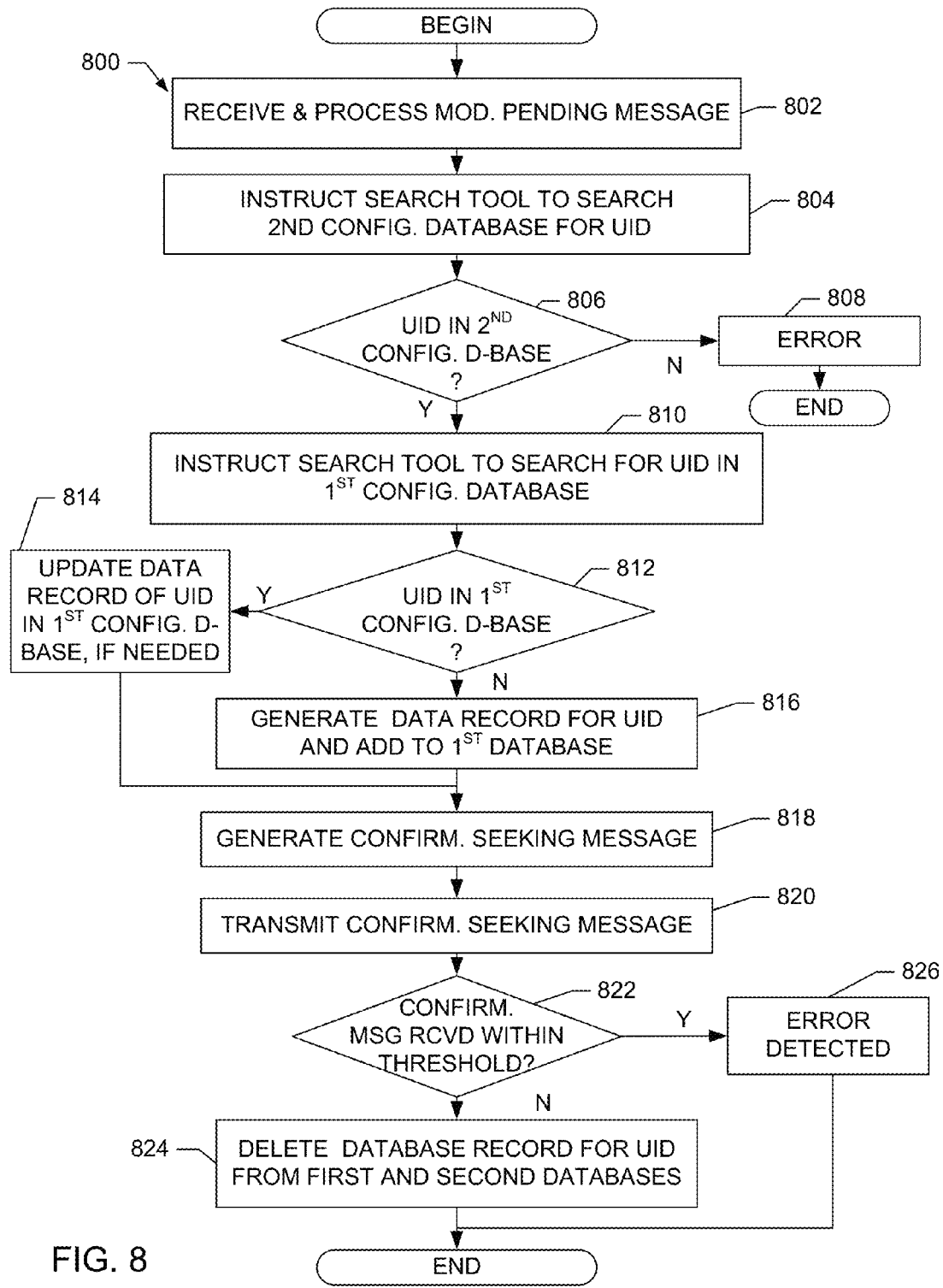
FIG. 8 is a flowchart representative of example computer readable instructions that can be executed by the example topology tool of FIG. 2 to communicate and track the removal/deletion of an example network element from the ISP network of FIG. 1.

Example machine readable instructions 800 that may be executed to implement the elements of FIGS. 1-2 are represented by the flowchart shown in FIG. 8. The example machine readable instructions 800 may be executed periodically and/or aperiodically (e.g., at predetermined intervals, based on an occurrence of a predetermined event, etc., or any combination thereof). The machine readable instructions 800 begin execution at a block 802 of FIG. 8 at which the example message processor 208 (see FIG. 2) receives a configuration reporting message indicating that a topology change event has occurred. In the illustrated example, the topology change event is the deletion/removal of an interface coupling the example PE router 106 (see FIG. 2) to the example CE router 108 (see FIG. 2) (also referred to as a "deletion complete" topology change event). The message processor 208 extracts the UID of the interface that was deleted from the reporting message and instructs the example database search tool 214 (see FIG. 2) to search the example second topology database 206 (see FIG. 2) for a post-confirmation data record corresponding to the UID (block 804). In response, the database search tool 214 searches the second topology database 206 (block 806). If the database search tool 214 determines that a post-confirmation data record corresponding to the UID is not present in the database (block 806), there is nothing to be deleted from the second topology database 206 such that an error is detected (block 808) and the method ends. As described above, a post-confirmation data record corresponding to the UID may not be present in the second topology database 206 as a result of the processing of an earlier-processed deletion complete reporting message.

If the example database search tool 214 determines that a post-confirmation data record corresponding to the UID is present in the example second topology database 206 (block 806), the example message processor 208 instructs the database search tool 214 to search the example first topology database 204 for a pre-confirmation data record corresponding to the UID (block 810). If the database search tool 214 determines that a pre-confirmation data record corresponding to the UID is present in the first topology database 204 (block 812), the message processor 208 instructs the database controller 212 to update the pre-confirmation data record in the first topology database 204 to include any new information contained in the deletion complete reporting message (block 814). If the database search tool 214 determines that a pre-confirmation data record corresponding to the UID is not present in the first topology database 204, the message processor 208 instructs the database controller 212 to generate and add a pre-confirmation data record corresponding to the UID to the first topology database 204 and to include information in the record indicating that the network element/device corresponding to the UID has been deleted (block 816). In some examples, if the database search tool 214 determines that a pre-confirmation data record corresponding to the UID is not present in the first topology database 204, the message processor 208 does not cause the database controller 212 to add a record corresponding to the UID.

Next, the example message processor 208 causes the example message generator 210 to generate a confirmation-seeking message that will be used to ensure that the interface corresponding to the UID has been deleted (block 818). The message processor 208 also instructs the message generator 210 to transmit the confirmation-seeking message to the UID corresponding to the deleted interface (block 820). If a response to the confirmation-seeking message is not received within a threshold amount of time (block 822), the interface is assumed to be deleted and the message processor 208 causes the example database controller 212 to delete the post-confirmation data record corresponding to the UID from the second topology database 206 (block 824). After deleting the post-confirmation data record, the method ends. In some examples, the message processor 208 also causes the database controller 212 to remove a pre-confirmation data record corresponding to the UID from the example first topology database 204 or to flag the pre-confirmation data record in the first topology database 204 to thereby indicate that the configuration event associated therewith has been confirmed (block 824).

If a response to the confirmation-seeking message is received, then the interface has not been deleted and an error is detected (block 826). Because the interface has not been deleted, the post-confirmation data record corresponding to the UID of the interface is not deleted from the example second topology database 206. In some examples, when the error is detected (block 826), the example message processor 208 can instruct the example message generator 210 to generate a message identifying the error to the example SDN controller 112 (see FIG. 2). After the error is detected (block 826), the method ends.

The first and second topology databases 204, 206 of FIG. 2 may be implemented in any manner. For example, the topology databases 204, 206, database controller 212 and database search tool 214 may be implemented using conventional database management systems and/or any other technology that permits the organized storage and access of data. Further the database files may be stored as flat files, database files, tables, etc.

Figure 9:
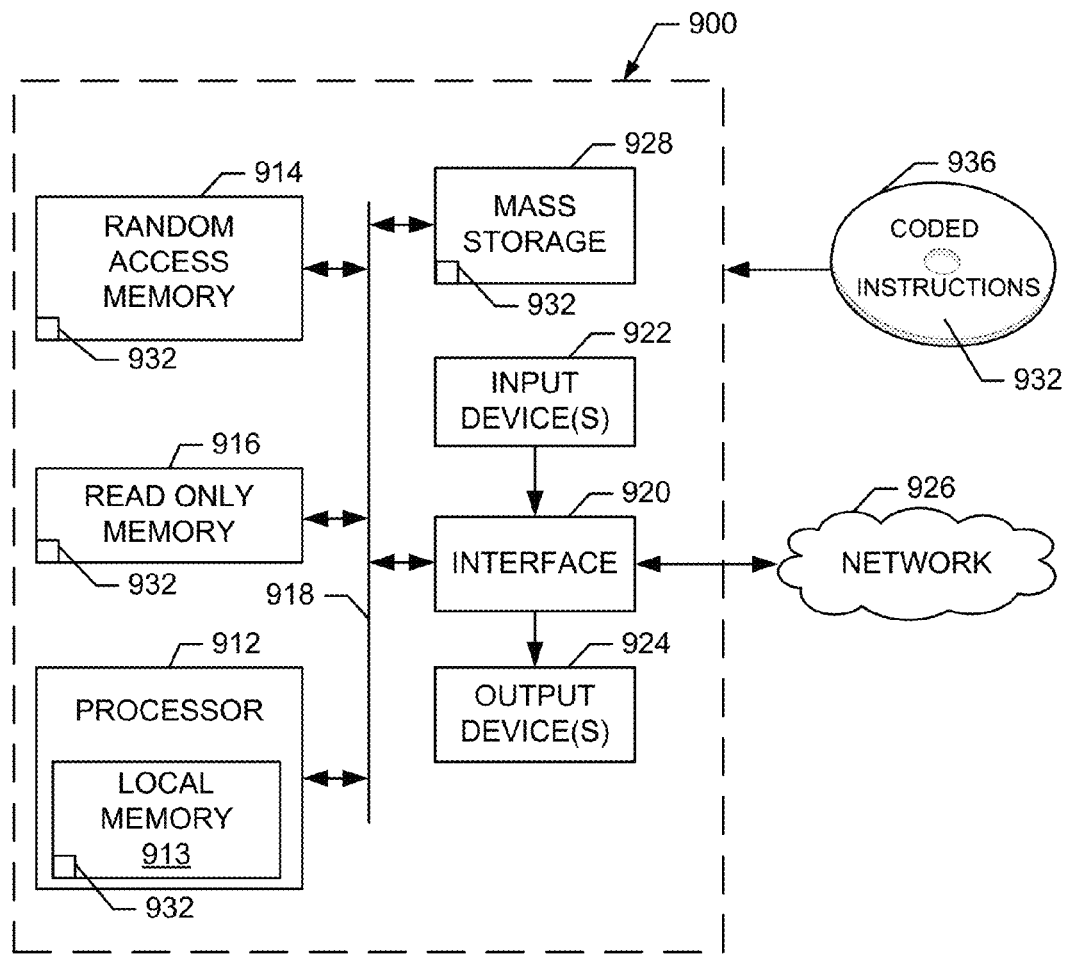
FIG. 9 is a block diagram of an example processing system that may execute example machine readable instructions of FIGS. 3, 4, 5, 6, 7, and/or 8 to implement the example systems of FIGS. 1 and/or 2.

FIG. 9 is a block diagram of an example processor platform 900 capable of executing the instructions of FIGS. 3, 4, 5, 6, 7, and/or 8 to implement the network management system 102 and topology tool 103 of FIG. 1 and FIG. 2. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 3, 4, 5, 6, 7 and/or 8 may be stored in the mass storage device 928, in the volatile memory 914, in the non-volatile memory 916, and/or on a removable tangible computer readable storage medium such as a CD or DVD.

At least some of the above described example methods and/or apparatus are implemented by one or more software and/or firmware programs running on a computer processor. However, dedicated hardware implementations including, but not limited to, application specific integrated circuits, programmable logic arrays and other hardware devices may likewise be constructed to implement some or all of the example methods and/or apparatus described herein, either in whole or in part. Furthermore, alternative software implementations including, but not limited to, distributed processing or component/object distributed processing, parallel processing, or virtual machine processing may also be constructed to implement the example methods and/or apparatus described herein.

The methods, systems and apparatus disclosed herein are configured to track changes to a network topology in real time. The term "network," as used herein, describes any type of electronic devices (real or virtual) that are in communication using any desired protocol. Such protocols and devices may be configured to communicate data signals, voice signals, video signals, streaming video signals, audio signals, etc. To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to track changes to a network topology, the method comprising:

in response to a reporting message originating at a software defined network controller, the reporting message including topology change information corresponding to a pending topology change event to occur in a network at a future time, generating, at a topology tool of a network management system, a confirmation-seeking message based on the topology change information to confirm the occurrence of the pending topology change event, the confirmation-seeking message being transmitted to a network element to the pending topology change event;

generating, at the topology tool, a pre-confirmation data record, the pre-confirmation data record to reflect the topology change information contained in the reporting message; and storing the pre-confirmation data record in a pre-confirmation topology database of the topology tool, the pre-confirmation data record being unconfirmed at a time of storage in the pre-confirmation topology database; and when a response to the confirmation-seeking message received at the topology tool confirms the pending topology change event has occurred, updating a post-confirmation topology database by storing a post-confirmation data record in the post-confirmation topology database, the post-confirmation data record being based on the pre-confirmation data record;

wherein the post-confirmation record is a second post-confirmation record, and the method further includes determining whether a first post-confirmation data record corresponding to the network element subject to the topology change event is stored in the post-confirmation topology database;

wherein the pre-confirmation data record is stored in the pre-confirmation topology database based on whether the first post-confirmation data record is determined to be stored in the post-confirmation topology database.

2. The method of claim 1, wherein the confirmation-seeking message includes an address of the network element subject to the pending topology change event, a type of pending topology change event, a status of the pending topology change event, and information indicating a position of the network element within the network topology.

3. The method of claim 1, wherein the pre-confirmation data record is a second pre-confirmation data record, and the second pre-confirmation data record is stored in the pre-confirmation topology database based on whether a first pre-confirmation data record corresponding to the network element is stored in the pre-confirmation topology database.

4. A tangible computer readable medium comprising computer readable instructions which, when executed, cause a computer to at least:
in response to a reporting message corresponding to a network device to be subject to a pending topology change event at a future time, transmit, to the network device, a confirmation-seeking message to confirm the pending topology change event has occurred, the reporting message generated by a software defined controller of a network;
store a pre-confirmation configuration record corresponding to the network device in a pre-confirmation configuration database, the pre-confirmation configuration record to include information about the pending topology change event, and the pre-confirmation configuration record being unconfirmed at a time of storage in the pre-confirmation configuration database; and
when a response to the confirmation-seeking message confirms the pending topology change event has occurred, store a post-confirmation configuration record in a post-confirmation configuration database.

5. The tangible computer readable medium of claim 4, wherein the confirmation-seeking message includes an loop-back address of the network device subject to the pending topology change event, a topology change event type identifier identifying a type of pending topology change event, and a status of the pending topology change event.

6. The tangible computer readable medium of claim 5, wherein the pre-confirmation configuration record is stored in the pre-confirmation configuration database based on whether the first post-confirmation configuration record is determined to be stored in the post-confirmation configuration database.

7. An apparatus to track a change to a network topology, the apparatus comprising:
a memory including machine readable instructions; and
a processor to execute the instructions to perform operations including:
in response to a reporting message containing topology change information corresponding to a pending topology change event to occur at a future time, the reporting message generated by a software defined controller,
generate a validation seeking message to validate occurrence of the topology change event, the validation seeking message transmitted to a network device to be subject to the pending topology change event;
generate a pre-validation topology record, the pre-validation topology record to reflect the topology change information contained in the reporting message;
store the pre-validation topology record in a pre-validation topology database; and
when a response to the validation seeking message validates the topology change event has occurred, store a post-validation topology record in a post-validation topology database, the response being received from the network device.

8. The apparatus of claim 7, wherein the pre-validation topology record is used to create the post-validation topology record.

9. The apparatus of claim 7, wherein the validation seeking message includes an address of the network device subject to the pending topology change event, type information identifying a type of the pending topology change event, and a status of the pending topology change event indicating the status of the pending topology change event.

10. The apparatus of claim 7, wherein the post-validation topology record is a second post-validation topology record and the operations further include determining whether a first post-validation topology record corresponding to the network device is stored in the post validation topology database, the pre-validation topology record being stored in the pre-validation topology database based on whether the first post-validation topology record is determined to be stored in the post validation topology database.

11. The method of claim 1, further including, when a response to the confirmation seeking message is received, updating the pre-confirmation database to indicate that the pending topology change event has occurred.

12. The method of claim 1, further including, when a response to the confirmation seeking message is not received at the topology tool within a threshold amount of time, generating, at the topology tool a request for updated information about the pending topology change event, the request for updated information being transmitted to the software defined controller.

13. The tangible computer readable medium of claim 4, wherein the instructions further cause the computer to, when a response to the confirmation-seeking message is received, update the pre-confirmation topology database to indicate that the pending topology change event has occurred.

14. The tangible computer readable medium of claim 4, wherein the instructions further cause the computer to, when a response to the confirmation seeking message is not received at the computer within a threshold amount of time, generate, a request for updated information about the pending topology change event, the request for updated information being transmitted to the software defined controller.

15. The apparatus of claim 7, wherein the operations further include, when a response to the validation seeking message is received, update the pre-validation topology database to indicate that the pending topology change event has occurred.

16. The apparatus of claim 7, wherein the operations further include, when a response to the validation seeking message is not received at the computer within a threshold amount of time, generate, a request for updated information about the pending topology change event, the request for updated information being transmitted to the software defined controller.

* * * * *